(12) United States Patent
Kawabe et al.

(10) Patent No.: US 8,913,162 B2
(45) Date of Patent: Dec. 16, 2014

(54) IMAGE PROCESSING METHOD, IMAGE PROCESSING APPARATUS AND IMAGE CAPTURING APPARATUS

(75) Inventors: Takashi Kawabe, Hachioji (JP); Shigeyuki Ueda, Kodaira (JP)

(73) Assignee: Konica Minolta, Inc., Tokyo (JP)

( * ) Notice: Subject to any disclaimer, the term of this patent is extended or adjusted under 35 U.S.C. 154(b) by 98 days.

(21) Appl. No.: 13/882,552

(22) PCT Filed: Oct. 27, 2011

(86) PCT No.: PCT/JP2011/074750
§ 371 (c)(1),
(2), (4) Date: Apr. 30, 2013

(87) PCT Pub. No.: WO2012/060269
PCT Pub. Date: May 10, 2012

(65) Prior Publication Data
US 2013/0215298 A1 Aug. 22, 2013

(30) Foreign Application Priority Data
Nov. 4, 2010 (JP) ................................. 2010-247261

(51) Int. Cl.
*H04N 5/217* (2011.01)
*G06T 5/00* (2006.01)
*H04N 5/232* (2006.01)
*H04N 5/357* (2011.01)

(52) U.S. Cl.
CPC ............. *H04N 5/217* (2013.01); *G06T 5/006* (2013.01); *H04N 5/23238* (2013.01); *H04N 5/3572* (2013.01)
USPC .......................................................... 348/241

(58) Field of Classification Search
CPC . H04N 5/217; H04N 5/3572; H04N 5/23238; G06T 5/006
USPC ............... 348/241, 222.1, 252, 580, 625; 382/254, 255, 266, 276, 277
See application file for complete search history.

(56) References Cited

U.S. PATENT DOCUMENTS

| 5,586,231 A * | 12/1996 | Florent et al. ............. 345/472 |
| 2010/0246901 A1* | 9/2010 | Yang ........................... 382/107 |
| 2013/0058589 A1* | 3/2013 | Chai et al. .................. 382/255 |

FOREIGN PATENT DOCUMENTS

| JP | 2000-11166 A | 1/2000 |
| JP | 2008-301052 A | 12/2008 |
| JP | 2008-311890 A | 12/2008 |

(Continued)

*Primary Examiner* — Aung S Moe
(74) *Attorney, Agent, or Firm* — Lucas & Mercanti, LLP (57) ABSTRACT

An image processing method, an image processing apparatus and an image capturing apparatus are provided, which are capable of obtaining an output image exhibiting high visual recognizability while reducing the processing time with a circuit on a comparatively small scale. Datum plane system coordinates $x_d y_d z_d$ with a datum plane DP serving as a basis and having a fixed positional relationship with a virtual projection plane VP are set, and there is provided a two-dimensional LUT stored with $z_d$ coordinates in a direction perpendicular to the datum plane with respect to $x_d$- and $y_d$-coordinates on the datum plane DP and based on a shape of the virtual projection plane VP, and image data is calculated, by calculating the coordinates of the pixels on the virtual projection plane VP in the world coordinate system on the basis of the two-dimensional LUT and converting the calculated coordinates of the pixels on the virtual projection plane in the world coordinate system into a camera coordinate system by using a distortion correction coefficient of an optical system.

12 Claims, 10 Drawing Sheets

(56) References Cited

FOREIGN PATENT DOCUMENTS

| | | |
|---|---|---|
| JP | 2009-105546 A | 5/2009 |
| JP | 2010-170514 A | 8/2010 |
| JP | 2010-217984 A | 9/2010 |

* cited by examiner

IMAGE PROCESSING METHOD, IMAGE PROCESSING APPARATUS AND IMAGE CAPTURING APPARATUS

CROSS REFERENCE TO RELATED APPLICATION

This Application is a 371 of PCT/JP2011/074750 filed on Oct. 27, 2011, which claimed the priority of Japanese Patent Application No. 2010-247261 filed on Nov. 4, 2010, the contents of each of which are incorporated herein by reference in their entirety.

TECHNICAL FIELD

The present invention relates to an image processing method, an image processing apparatus and an image capturing apparatus, which execute a distortion correction process of an image captured by an image capturing element via an optical, system including a condenser lens.

BACKGROUND ART

Generally, an image captured by an optical system including a lens having a short focal length and a larger angle of view as in the case of a wide-angle lens or a fisheye lens is accompanied by a distortion, and hence an image process is executed to correct, the distortion. Patent document 1 discloses, as a correction method of the prior art, a method of correcting the distortion occurring in the captured image captured by using the lens having the short focal length in a way that employs a correction, parameter of the lens.

Patent document 2 has a contrivance of including an optical distortion correction parameter with respect to a discrete lens position within a range of performing an optical zoom, restricting a lens position when performing the zoom to a lens position with the optical distortion correction parameter and linking the optical zoom between the restricted positions with an electronic zoom against such a problem that it is difficult in terms of a throughput for a simple image capturing apparatus to calculate the optical distortion correction parameter on a per lens position basis from a wide-angle end to a telescopic end of an optical zoom mechanism on the basis of an interpolation arithmetic operation, which entails an external information processing device.

DOCUMENTS OF PRIOR ARTS

Patent Documents

Patent Document 1 Japanese Patent Application Laid-Open Publication No. 2009-140066
Patent Document 2 Japanese Patent Application Laid-Open Publication No. 2009-105546

DISCLOSURE OF THE INVENTION

Problems to be Solved by the Invention

As disclosed in Patent document 1, if the captured image obtained through the lens is linearly corrected; the image becomes harder to view in the peripheral portion than at the central portion because of a form collapsed due to an enlarged image. A cylindrical distortion correction and a spherical distortion correction are given as the corrections for preventing this phenomenon, however, if configured hardwarewise as an image processing apparatus in order to perform these corrections, the processing time elongates, and the circuit scale augments, resulting in a problem, that the cost increases.

Further, in the case of correcting the distortion on the basis of not an easy-to-model shape such as the cylinder and the sphere but a free shape for improving the visual recognizability to a greater degree than using the cylindrical distortion correction and the spherical distortion correction, it follows that the processing time increases and the circuit scale augments.

Furthermore, in the Patent document 1, the distortion of the input image is corrected, by employing the correction parameter, with the result that a resolution decreases when cutting out an image at an end portion deviating from the center of the input image, and the flexibility to the conversion of the viewpoint such as "pan" and "tilt" is insufficient.

Moreover, Patent document 2 aims not at the conversion of the viewpoint but at setting the distortion correction parameter so to be flexible to changes in optical parameters of the optical zoom and the stop, but does not support the real-time display.

Especially when displaying the captured image on a monitor in real time as in the case of a monitor camera and an on-vehicle camera, a new image process is required each time the process such as the zoom, the pan and the tilt is added based on a user' instruction of changing an image capturing area, and, if configured hardwarewise as the image processing apparatus, it follows that the processing time elongates, the circuit scale augments and the cost increases.

It is an object of the present invention to provide, in view of these problems, an image processing method, an image processing apparatus and an image capturing apparatus, which are capable of obtaining an output, image exhibiting high visual recognizability while reducing the processing time with a circuit on a comparatively small scale.

Solution to Problem

The object given above is accomplished by the inventions described as below.

1. An image processing method of obtaining image data undergoing a distortion correction process by using plural pieces of pixel data acquired when an image capturing element including a plurality of pixels receives the light via an optical system including a lens, includes:

a first step of setting a position and a size of a datum plane always having a fixed, positional relationship with a virtual projection plane in a world coordinate system on the basis of a user's instruction; datum plane set in the first step, and converting the calculated coordinates into a camera coordinate system by using a distortion correction coefficient of the optical system;

a third step of calculating the image data on the virtual projection plane on the basis of the plural pieces of pixel data and the coordinates in the camera coordinate system with the conversion being done in the second step, wherein datum plane system coordinates $x_d y_d z_d$ with the datum, plane serving as a basis are set, and there is provided a two-dimensional LUT stored with $z_d$ coordinates in a direction perpendicular to the datum plane with respect to $x_d$- and $y_d$-coordinates on the datum plane and based on a shape of the virtual projection plane, and the second step includes calculating the coordinates of the respective pixels on the virtual projection plane in the world coordinate system on the basis of the two-dimensional LUT.

2. In the image processing method according to the item 1, the two-dimensional LUT is data corresponding to lattice points arranged at predetermined pitches on the datum, plane, and the data between the lattice points are calculated based on a linear interpolation.

3. In the image processing method according to the item 1 or 2, the virtual projection plane is configured by a free curved surface.

4. In the image processing method according to any one of the items 1 to 3, the two-dimensional LUT can be selected from a plurality of two-dimensional LUTs corresponding to the virtual projection planes taking a plurality of different shapes, and the selected two-dimensional LUT is used in the second step.

5. An image processing apparatus for obtaining image data undergoing a distortion correction process by using plural pieces of pixel data acquired when an image capturing element including a plurality of pixels receives the light via an optical system, includes:

an image processing unit calculating coordinates of the respective pixels on the virtual projection plane in the world coordinate system on the basis of the datum plane, of which a position and a size are set, always having a fixed positional relationship with a virtual projection plane, converting the calculated coordinates into a camera coordinate system by using a distortion correction coefficient, and calculating the image data on the virtual projection plane on the basis of the coordinates in the camera coordinate system with the conversion being done and the plural pieces of pixel data; and a storage unit retaining a two-dimensional LUT stored, datum plane system coordinates $x_d y_d z_d$ with the datum plane as a basis being set, with $z_d$ coordinates in a direction perpendicular to the datum plane with respect to $x_d$- and $y_d$-coordinates on the datum plane and based on a shape of the virtual projection plane, wherein the image processing unit calculates the coordinates of the respective pixels on the virtual projection plane in the world coordinate system on the basis of the two-dimensional LUT.

6. In the image processing apparatus according to the item 5, the two-dimensional LUT is data corresponding to lattice points arranged at predetermined pitches on the datum plane, and the data between the lattice points are calculated based on a linear interpolation.

7. In the image processing apparatus according to the item 5 or 6, the virtual projection plane is configured by a free curved surface.

8. In the image processing apparatus according to any one of the items 5 to 7, the storage unit retains a plurality of two-dimensional LUTs corresponding to the virtual projection planes taking a plurality of different shapes, and the image processing unit calculates the coordinates of the respective pixels on the virtual projection plane in the world coordinate system on the basis of the two-dimensional LUT selected from the plurality of two-dimensional LUTs.

9. An image capturing apparatus includes;

an optical system;

an image capturing element including a plurality of pixels;

a setting unit setting a position and a size of the datum plane always having a fixed positional relationship with the virtual projection plane in the world coordinate system;

an image processing unit calculating coordinates of the respective pixels on the virtual projection plane in the world coordinate system on the basis of the datum plane set by the setting unit, converting the calculated coordinates into a camera coordinate system by using a distortion correction coefficient of the optical system, and calculating the image data on the virtual projection plane on the basis of the coordinates in the camera coordinate system with the conversion being done and the pixel data obtained from the plurality of pixels; and a storage unit retaining a two-dimensional LUT stored; datum plane system coordinates $x_d y_d z_d$ with the datum plane as a basis being set, with $z_d$ coordinates in a direction perpendicular to the datum plane with respect to $x_d$- and $y_d$-coordinates on the datum plane and based on a shape of the virtual projection plane, wherein the image processing unit calculates the coordinates of the respective pixels on the virtual projection plane in the world coordinate system on the basis of the two-dimensional LUT.

10. In the image capturing apparatus according to the item 9, the two-dimensional LUT is data corresponding to lattice points arranged at predetermined pitches on the datum plane, and the data between the lattice points are calculated based on a linear interpolation.

11. In the image capturing apparatus according to the item 9 or 10, the virtual projection plane is configured, by a free curved surface.

12. In the image capturing apparatus according to any one of items 9 to 11, the storage unit retains a plurality of two-dimensional LUTs corresponding to the virtual projection planes taking a plurality of different shapes, and the image processing unit calculates the coordinates of the respective pixels on the virtual projection plane in the world coordinate system on the basis of the two-dimensional LUT selected by the setting unit from the plurality of two-dimensional LUTs.

Effects of the Invention

According to the present invention, the virtual projection plane taking the set free shape can be used in the way of calculating the coordinates of the respective pixels on the virtual projection plane in the world coordinate system by employing the two-dimensional LUT corresponding to the virtual projection plane raking the free shape. Then, the image data is generated based on the virtual projection plane such as this, thereby enabling the output image exhibiting the high visual recognizability to be acquired by executing the distortion correction process based on the free shape while reducing the processing time with the circuit on the comparatively small scale.

BRIEF DESCRIPTION OF THE DRAWINGS

An explanatory schematic view illustrating the distortion correction according to the present embodiment.

FIG. 1 A view depicting a shape of a virtual projection plane VP illustrated in FIG. 1; FIG. 2(a) is a front view; FIG. 2(b) is a top view; and FIG. 2(c) is a side view.

FIG. 9(*a*) shows the example of the input image; and FIGS. 9(*b*), 9(*c*) and 9(*d*) show the examples of the output images.

FIG. 11(*a*) is a front view; FIG. 11(*b*) is a top view; and FIG. 11(*c*) is a side view.

MODE FOR CARRYING OUT THE INVENTION

The present invention will hereinafter be described based on an embodiment but is not limited to the embodiment.

Figure 1:
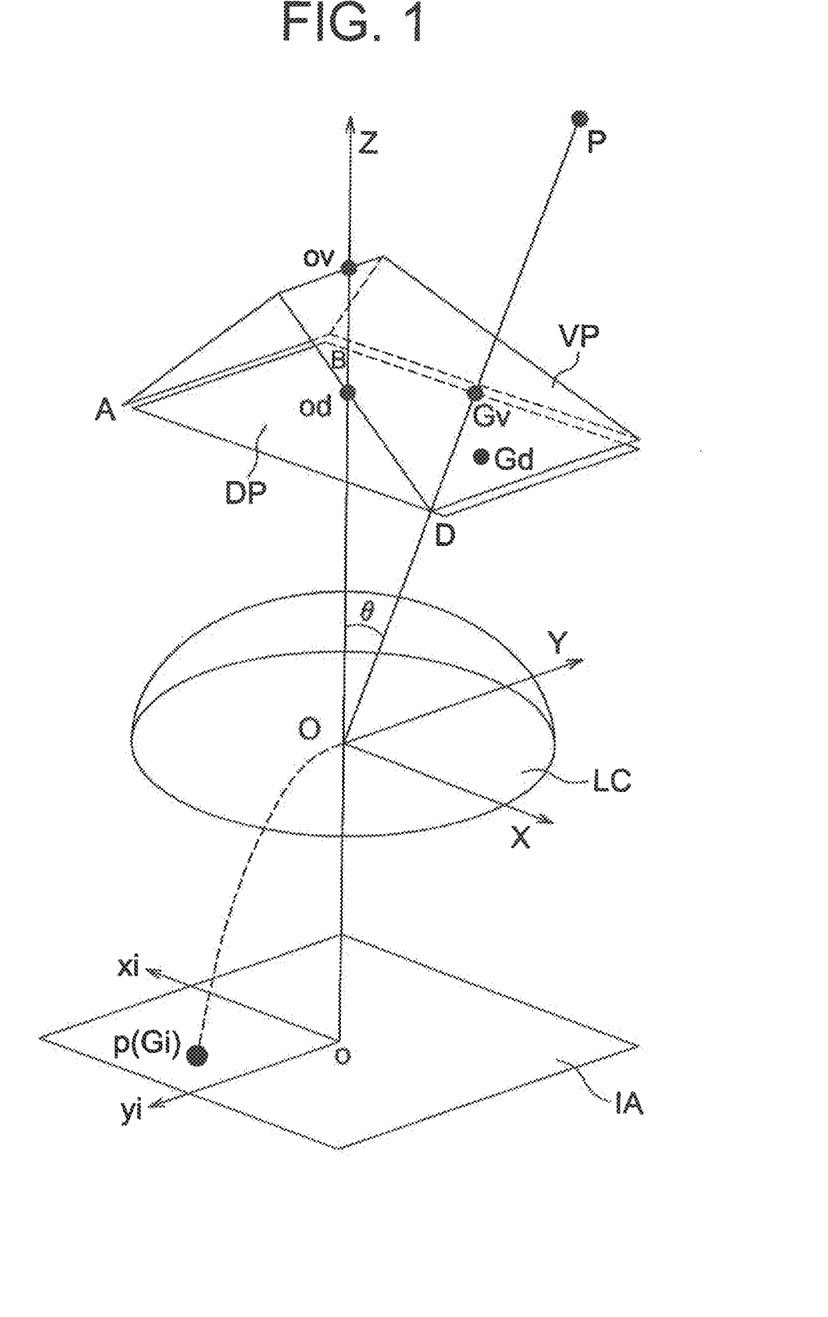

FIG. 1 is an explanatory schematic diagram of how a distortion is corrected according to the present embodiment. In FIG. 1, the symbols X, Y, Z represent a world coordinate system, in which an origin O is defined as a center of the lens. The symbol Z denotes an optical axis, and an XY plane embraces a lens central surface LC passing through the lens center O. A point P is an object point of a target object in the world coordinate system XYZ. The symbol θ stands for an incidence angle with respect to the optical axis (coincident with the Z-axis).

The symbols $x_i$, $y_i$ represent a camera coordinate system $x_i$, $y_i$, and an $x_i y_i$ plane corresponds to an image capturing element surface IA. A symbol o indicates an image center defined as an intersection between the optical axis Z and the image capturing element surface. A point p is a point (corresponding to an image forming point) on the image capturing element surface in the camera coordinate system and is what the object point P is converted into the camera coordinate system by use of a distortion correction coefficient based on a parameter (which will hereinafter be termed a "lens parameter") based on lens characteristics.

A symbol VP is a virtual projection plane formed by a surface taking an unrestricted shape. The virtual projection plane VP is set on the side opposite to the image capturing element (and the image capturing element surface IA) with respect to the lens position (the lens central surface LC) of the optical system. A datum plane DP is enabled to change its shape, its size and a position in the world coordinate system on the basis of a user's instruction given on an operation unit 130 (see FIG. 3).

The datum plane DP is a two-dimensional datum plane and is always in a fixed positional relationship with the virtual projection plane VP, and this positional relationship is reflected in a two-dimensional LUT (Lookup Table) which will be described later on. With a change in size of the datum plane DP, a size of the virtual projection plane VP is changed, and a position of the virtual projection plane VP is changed with the change in position of the datum plane DP. The symbols $x_d$, $y_d$, $z_d$ represent a datum plane coordinate system, in which an $x_d y_d$ plane corresponds to the datum plane DP, and a $z_d$-axis is an axis perpendicular to the datum plane. The centers of the datum plane DP and of the virtual projection plane VP are coaxial with the optical axis Z in their initial statuses (which imply setting their initial positions, and the same is applied to the following description), and the datum plane DP is parallel with the XY plane in the world coordinate system.

In the present application, the phrase "the change in position" is defined as a concept embracing not only a case of moving the datum plane DP and the virtual projection plane VP in parallel (which corresponds to a transitional vector) on the XY plane but also a change in angle (which is also said to be a change in attitude and corresponds to a rotation vector) with respect to the XY plane.

A "cylindrical distortion correction" is to correct the distortion by using the virtual projection plane VP taking such a shape that a cylinder is cut by a plane parallel to the axial direction, and the virtual projection plane VP enables the $z_d$ coordinate to be specified, if the $x_d$ coordinate (or the $Y_d$ coordinate) on the datum plane DP can be specified.

A "tri-mirror distortion correction" is to correct the distortion by employing the virtual projection plane VP taking a shape defined as a continuous shape of three flat surfaces and formed by a main mirror portion disposed at the center thereof and being parallel to the datum plane DP and by two side mirror portions connected to the main mirror portion at a predetermined angle on both side of the main mirror portion. The virtual projection plane VP enables the $z_d$ coordinate to be specified if the $x_d$ coordinate (or the $Y_d$ coordinate) on the datum plane DP can be specified.

A "spherical distortion correction" involves using a shape in which an internal surface of a sphere is cut in rectangle. The virtual projection plane VP enables the $z_d$ coordinate to be specified if a distance from the center of the datum plane DP can be specified.

A "free shape correction" is a distortion correcting method that involves using the virtual projection plane VP taking a free shape. The "free shape" connotes shapes other than curved surfaces (cylinders, spheres) and flat, surfaces (tri-mirrors, simple flat surfaces), which can be expressed by elementary functions. To be more specific, the "virtual projection plane VP" connotes a shape capable of specifying the $z_d$ coordinate by specifying not any one of but both of the $x_d$ coordinate and the $y_d$ coordinate. The "free curved surface" represents a free shape and also a shape formed by the curved surfaces exclusive of the curved surfaces (cylinders, spheres) which can be expressed by the elementary functions.

Figure 2:
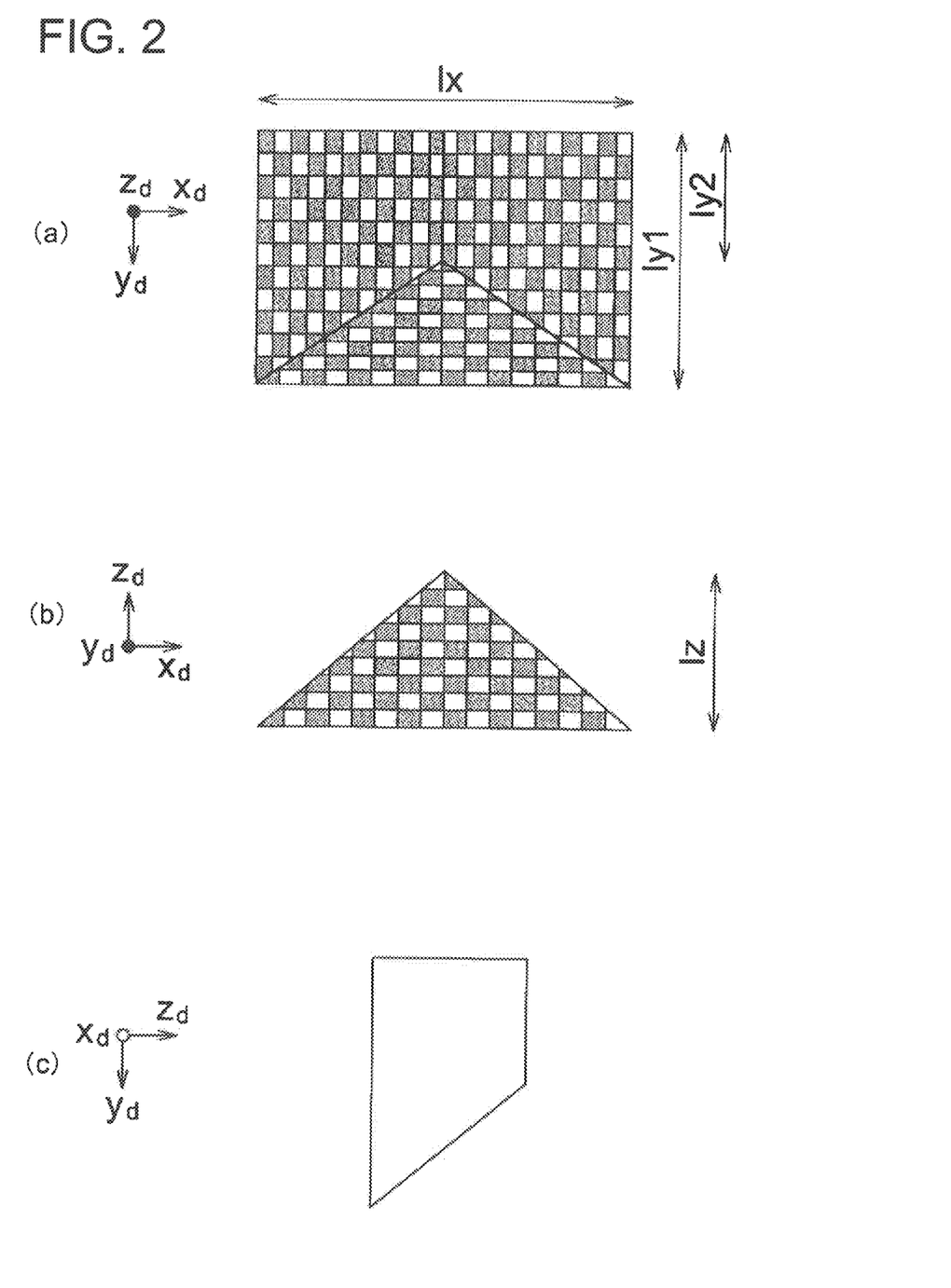

FIGS. 2(*a*) to 2(*c*) are views each illustrating the shape of the virtual projection plane VP depicted in FIG. 1. FIG. 2(*a*) is a front view; FIG. 2(*b*) is a top view; and FIG. 2(*c*) is a side view. The datum plane DP is not illustrated in these drawings throughout. The free shape depicted in FIG. 2 is such a shape given by way of the virtual projection plane VP that a triangle pole is cut by a plane parallel to the bottom surface. The shape of the virtual projection plane VP can be changed by setting lengths $l_x$, $l_{y1}$, $l_{y2}$, $l_z$ shown in FIG. 2. With the shape being changed, the two-dimensional LUT containing the description of the free shape, which will be mentioned later on, is recalculated and thus updated. Further, the shape of the virtual projection plane may be, without being limited to this shape, a shape of a semi-sphere formed in a way that cuts the sphere by a plane intersecting this sphere, or a shape of an inner peripheral surface of a spherical crown or a shape formed in a way that cuts out the inner peripheral surface, of the sphere in rectangle. Other available shapes are a shape formed by connecting the plurality of surfaces such as the shape of the tri-mirrors constructed of three pieces of consecutive panels and a shape formed by vertically cutting a bowl that will be described, later on.

With respect to the virtual projection plane VP in the initial status, a center ov of the virtual projection plane VP and a center od of the datum plane DP are positioned on the Z-axis in predetermined shapes and sizes. The symbol Gv represents a point at which an object point P is projected on the virtual projection plane VP, and is an intersection between a straight line passing through the object point P and the lens center O and the virtual projection plane VP. The symbol Gd is a point at which the point Gv is projected on the datum plane DP.

Figure 3:
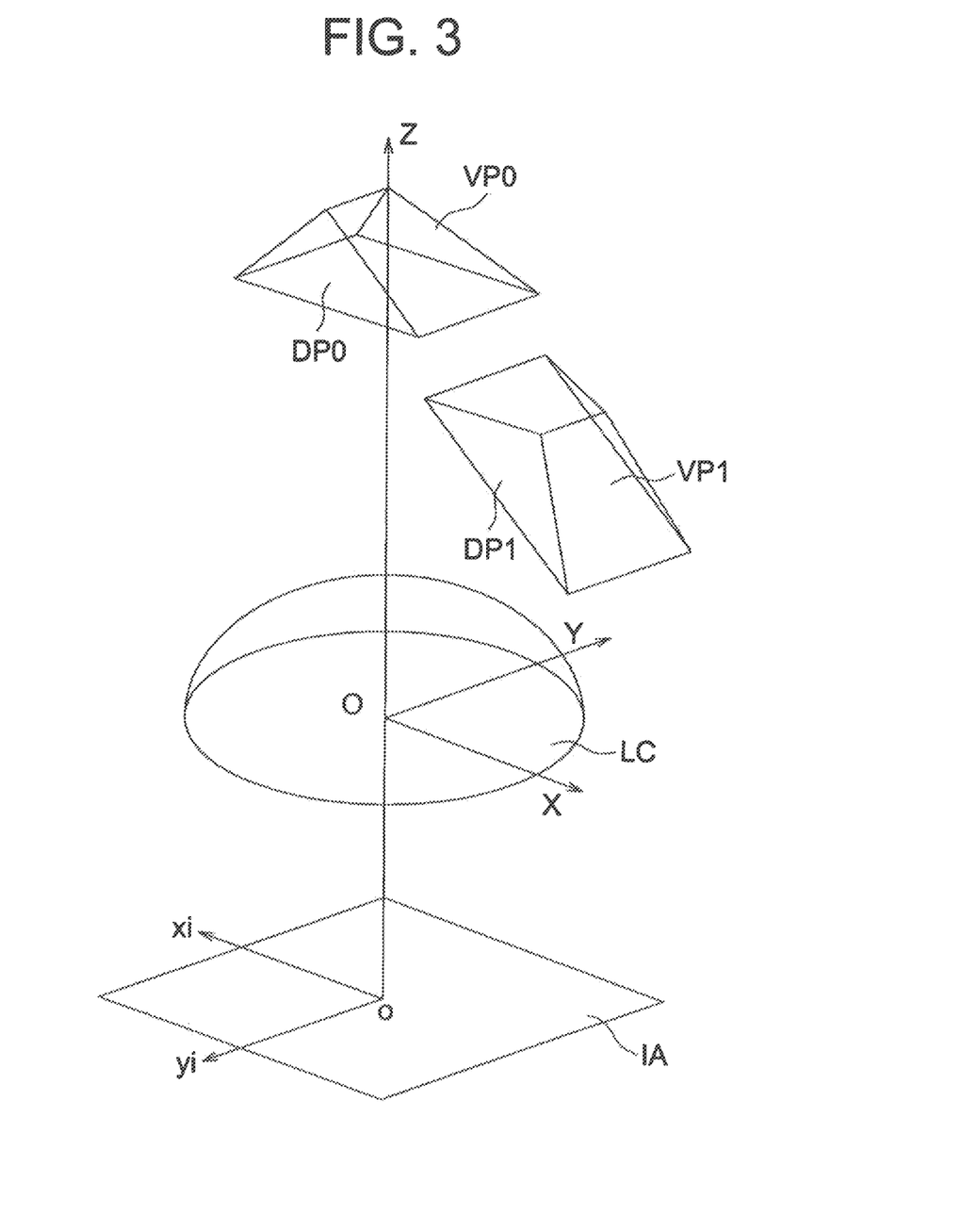
FIG. 3 A view illustrating an example of shifting a position of the virtual projection plane VP.

FIG. 3 illustrates an example in which the position of the datum plane DP and the position of the virtual projection plane VP are shifted based on an input of the operation unit 130 that will be described later on. A virtual projection plane VP0 and a datum plane DP0 are the surface and the plane before being shifted, while a virtual projection plane VP1 and a datum plane DP1 are the surface and the plane after being shifted, in which the virtual projection plane and the datum plane are rotated on the XZ plane in the world coordinate system.

[Block Diagram]

Figure 4:
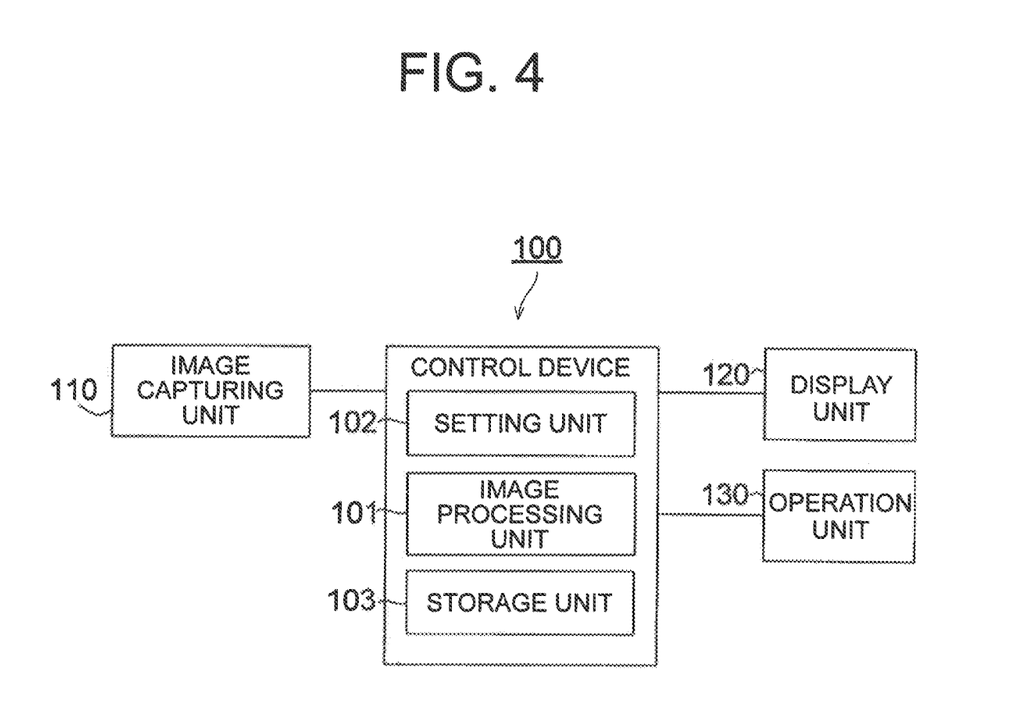
FIG. 4 A block diagram schematically showing a configuration of an image capturing apparatus.

FIG. 4 is a block diagram schematically illustrating a configuration of an image capturing apparatus. The image capturing apparatus includes an image capturing unit 110, a control device 100, a display unit 120 and an operation unit 130.

The image capturing unit 110 is configured to include a short focus lens, an image capturing element, etc. In the present embodiment, the lens is exemplified such as a wide-angle lens and a fisheye lens.

The control device 100 is configured to include an image processing unit 101, a setting unit 102 and a storage unit 103.

The setting unit 102 sets the shape, the position and the size of the datum plane DP on the basis of instructions inputted, to the operation unit 130.

The image processing unit 101 calculates the coordinates of the respective pixels on the virtual projection plane VP in the world coordinate system on the basis of the settings of the shape, the position and the size of the datum plane DP and on the basis of the two-dimensional LUT corresponding to the shape of the virtual projection plane VP, then generates a conversion table for the calculated coordinates into a camera coordinate system, and generates image data to be displayed on the display unit 120 by processing the pixel data of the image captured by the image capturing unit 110 by use of the conversion table.

The storage unit 103 is stored with distortion correction coefficients calculated by lens parameters of the lens and with the two-dimensional LUT based on the shape of the virtual projection plane VP. Further, the storage unit 103 gets also stored with the position and the size of the datum plane DP and the generated conversion table. Still further, if using a plurality of virtual projection planes taking different shapes as in the virtual projection plane (FIG. 11 etc) having another shape that will be hereinafter described in addition to the virtual projection plane taking the shape depicted in FIG. 2 etc, the storage unit 103 can be stored with a plurality of two-dimensional LUTs corresponding thereto. In this case, the setting unit may select the two-dimensional LUT for use from the plurality of two-dimensional LUTs in a way that depends on a type of the application or through the user's input instruction to the operation unit 130. The type of the application is exemplified such as a monitor camera and an on-vehicle back monitor.

The display unit 120 includes a display screen, such as a liquid crystal display and sequentially displays, on this display screen, the image data generated by the image processing unit 101 on the basis of the pixel data of the images captured, by the image capturing unit 110.

The operation unit 130 includes a keyboard, a mouse or a touch panel disposed in superposition on the liquid crystal display of the display unit, and accepts the user's input operation.

[Control Flow]

Figure 5:
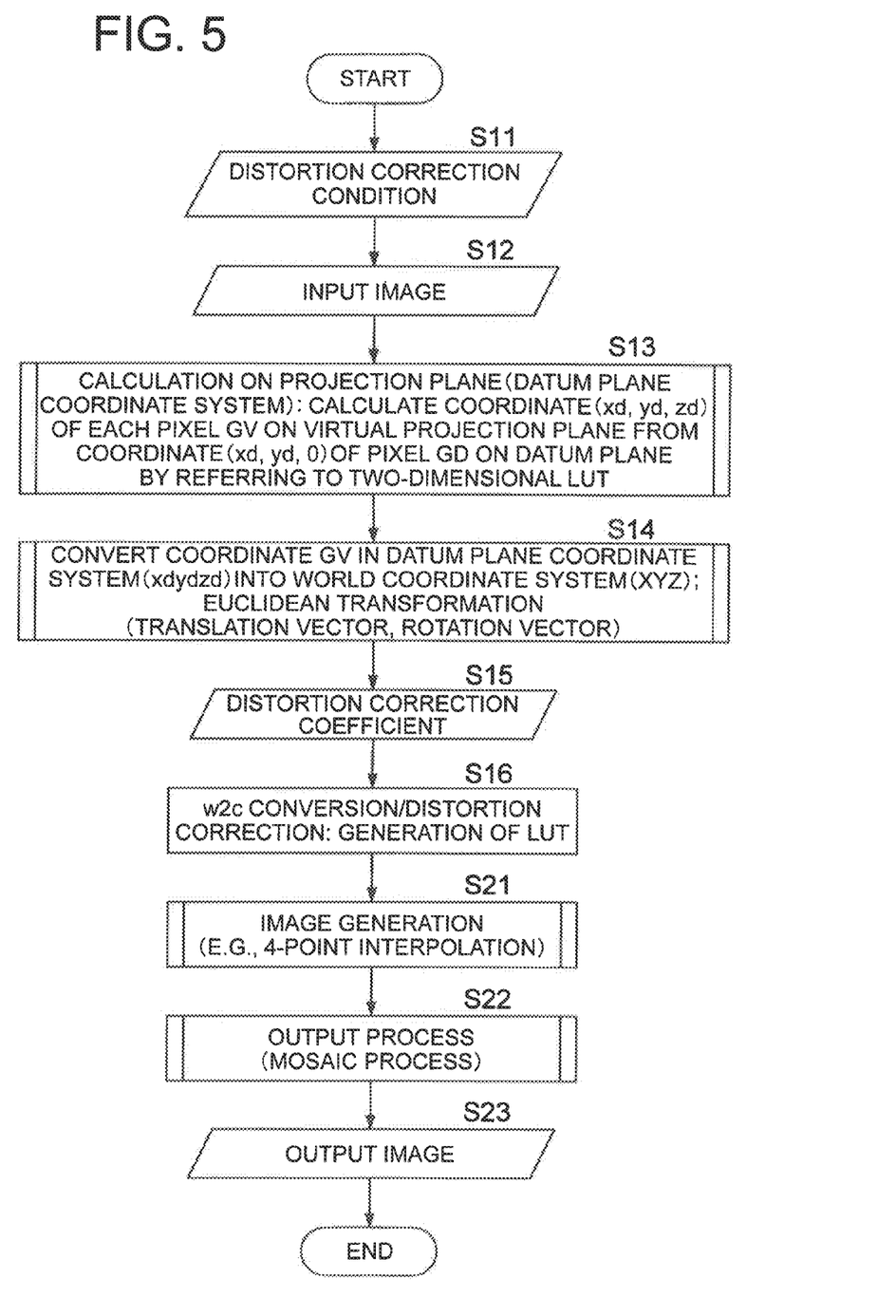
FIG. 5 A flowchart illustrating a control flow in the present embodiment.

FIG. 5 is a flowchart showing a control flow in the present embodiment. In step S11, the set distortion correction conditions are inputted. The distortion correction conditions (containing a conversion of a viewpoint) are set by setting the position and the size of the datum plane DP in the world coordinate system through the setting unit 102 in accordance with the user's input instruction to the operation unit 130 as described above. In step S12, the image signals are inputted from the image capturing unit 110, and the input images are acquired at a frame rate of, e.g., 60 fps (frames per second).

Figure 6:
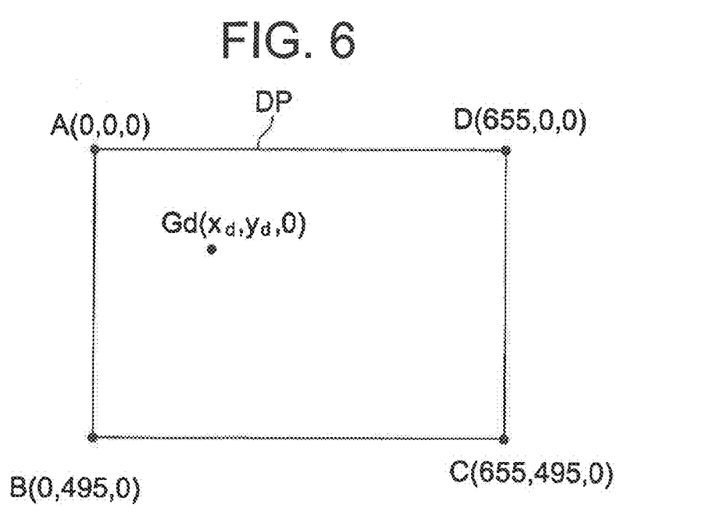
FIG. 6 An explanatory schematic view illustrating a datum plane DP.
Figure 7:
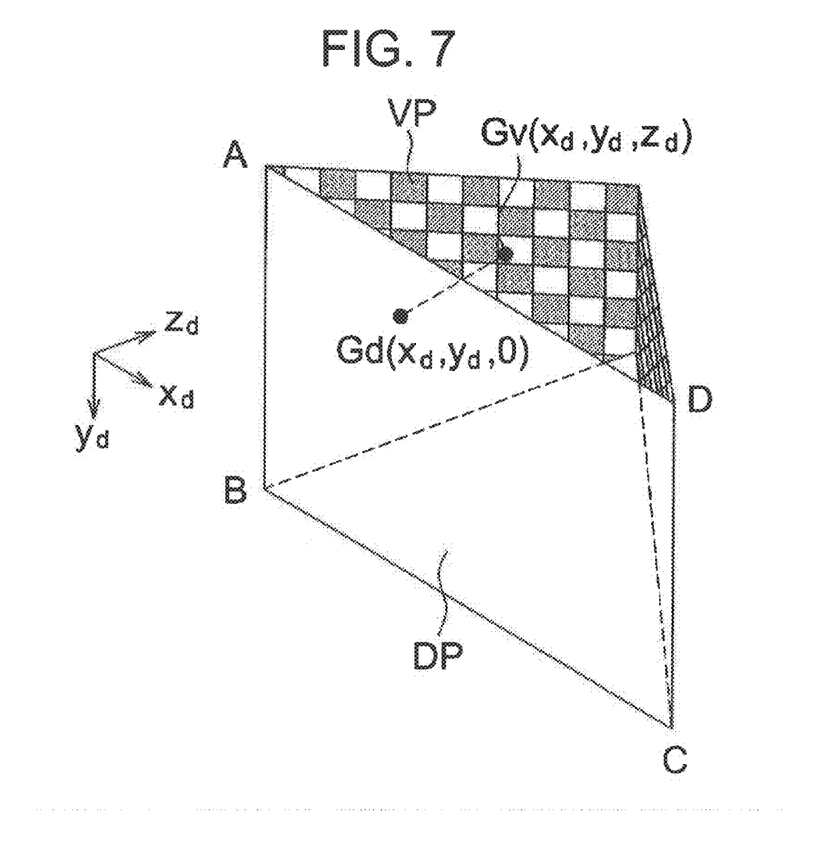
FIG. 7 A schematic view illustrating a relationship between the virtual projection plane VP and the datum plane DP.

FIG. 6 is an explanatory schematic view of the datum plane DP. FIG. 7 is a schematic view illustrating a positional relationship between the virtual projection plane VP and the datum plane DP. As described above, the datum plane DP are positioned on the $x_d y_d$ plane in the datum plane coordinate system ($x_d y_d z_d$), and an area of the datum plane DP is set so as to embrace a region of the projection view depicting a vertical, projection of the virtual projection plane VP with the $x_d y_d$ plane serving as a projection plane. As illustrated in FIG. 6, a plane surrounded by a point A (0, 0, 0) a point B (0, 495, 0), a point C (655, 495, 0) a point D (655, 0, 0) at four corners of the datum plane DP in the datum plane coordinate system is divided into pixels Gd counting such as 656×496 pixels (a total pixel count is 3,250,000) at equal intervals. Table 1 is an example of the two-dimensional LUT in which the $z_d$ coordinate is output in regards to an input of the $x_d$ coordinate and an input of the $y_d$ coordinate. The corresponding coordinates ($x_d, y_d, z_d$) of the pixels Gd on the virtual projection plane VP are calculated by referring to the two-dimensional LUT from which to derive $z_d$ out of the whole pixels Gd in a way that refers to the coordinates $x_d$ and $y_d$ as given in Table 1. Note that the total pixel count is just only an exemplification and may also be set to values other than the value given above.

TABLE 1

| | $x_d$ | | | | | | |
|---|---|---|---|---|---|---|---|
| $y_d$ | 0 | 1 | 2 | 3 | 4 | 5 | ... |
| 0 | 0 | 1 | 1 | 2 | 2 | 3 | |
| 1 | 0 | 1 | 1 | 2 | 2 | 3 | |
| 2 | 0 | 1 | 1 | 2 | 2 | 3 | |
| 3 | 0 | 1 | 1 | 2 | 2 | 3 | |
| 4 | 0 | 1 | 1 | 2 | 3 | 4 | |
| 5 | 0 | 1 | 2 | 3 | 3 | 4 | |
| . | | | | | | | |
| . | | | | | | | |
| . | | | | | | | |

As depicted in FIG. 7, the pixel Gd on the datum plane DP has such a relationship that the pixel Gv on the virtual projection plane VP is projected on the datum plane DP, and hence $x_d$ and $y_d$ of both of the pixel Gd and the pixel Gv are coincident with each other. The two-dimensional LUT is stored with the coordinate $z_d$ with respect to the coordinates $x_d, y_d$ on the basis of the shape of the virtual projection plane VP, and the coordinate $z_d$ of the pixel Gv is calculated based on the coordinates $x_d, y_d$ of the pixel Gd, whereby the position of the coordinates ($x_d$, $y_d$, $z_d$) of the pixel Gv is derived. This process is executed for all the pixels Gd. What has been done so far is step SI 3.

In step S14, the coordinate of the pixel Gd calculated in step S13 is converted into the world coordinate system (XYZ) from the datum plane coordinate system ($x_d$, $y_d$, $z_d$). This conversion is performed, based on the setting information of the positional change of the datum, plane DP.

In step S15, the distortion correction coefficient determined based, on the lens parameter of the image capturing unit 110, which is stored in the storage unit 103, is read out.

In step S16, the LUT (Lookup Table) is generated, which is used tor converting (w2c conversion) the coordinates of the virtual projection plane VP set by use of the distortion correction coefficient acquired in step S15 into the camera coordinate system from, the world coordinate system.

Figure 8:
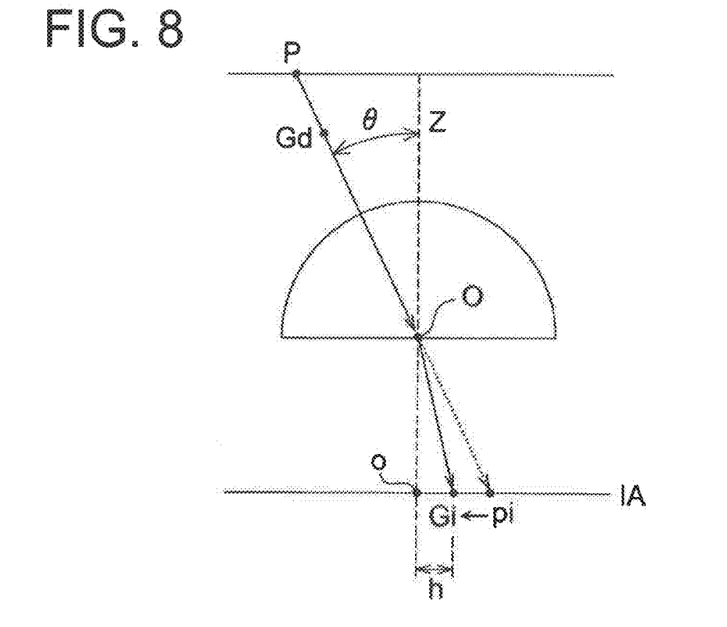
FIG. 8 An explanatory view illustrating coordinates on the virtual projection plane VP.

The generation of the LUT involves calculating pixels Gi (x', y') on the image capturing element surface IA in the corresponding camera coordinate system from the coordinates of the respective pixels Gv in the world coordinate system and from the distortion correction, coefficient acquired in step S15. FIG. 8 is a schematic diagram illustrating a relationship between an image height h and an incidence angle θ. The image height (a distance from the optical axis Z) of the target object (the object point P) on the image capturing element surface IA is determined, from the incidence angle θ and the distortion correction coefficient. A symbol "pi" represents an image forming position of the object point P on the image capturing element surface IA in a case where there is no distortion correction, and the image forming position after correcting the distortion becomes "Gi". From what has been discussed so far, it follows that the coordinates of the respective pixels on the virtual projection plane are converted into the coordinates in the camera coordinate system from the datum plane coordinate system via the world coordinate system. Namely, the coordinates are converted based on the lens data in a way that applies the coordinates in the datum plane coordinate system to the coordinates in the camera coordinate system by specifying which coordinate position in the camera coordinate system the position in the datum plane, coordinate system corresponds to. On this occasion, there are carried out together the distortion correction and the viewpoint conversion such as a rotation, a parallel movement, enlargement and reduction, which are entailed by calculating the position of the virtual projection plane VP.

In step S21, the images of the input images (image signals) inputted in step S12 are generated by employing the LUT referred to in step S21. An image generation method is exemplified by a 4-point interpolation as will be explained below.

The pixels of the image capturing element, which are referred to, are determined from the coordinates ($x_i'$, $y_i'$) of the pixels Gi depicted in FIGS. 1 and 8 in the camera coordinate system. On this occasion, and $y_i$ of the coordinates ($x_i$, $y_i$) of the respective pixels of the image capturing element are integers, however, $x_i'$ and $y_i'$ of the pixels Gi ($x_i'$, $y_i'$) used in the process of generating the LUT in step S16 can take, without being limited to the integers, real values having decimal parts. If $x_i'$ and $y_i'$) are the integers and if the position of the pixel Gi ($x_i'$, $y_i'$) and the position of the pixel of the image capturing element are coincident with each other, the pixel data of the pixels of the corresponding image capturing element can be used as the pixel data of the output image corresponding to the pixels Gv (X, Y, Z) on the virtual projection plane VP. Whereas if $x_i'$ and $y_i'$ are neither the integers nor coincident with $x_i'$ and $y_i'$, the 4-point interpolation entails calculating the pixel data in a way that weights the pixels at adjacent four points with a simple average value of the pixel data of the pixels at upper four points proximal to the pixel Gi ($x_i'$, $y_i'$) as well as being peripheral to the calculated pixel Gi ($x_i'$, $y_i'$) or with a distance from the pixel Gi ($x_i'$, $y_i'$) and using the thus-calculated pixel data as the pixel data of the output image corresponding to the pixels Gv. Note that the interpolation may be, without being limited to the 4-point interpolation, a simple interpolation using one point as the peripheral point and a multipoint interpolation using 16 or more points.

In step S22, the output process is executed based on the generated image. The output process enables the output image to be acquired by performing an arithmetic operation of the BGR (Blue, Green, Red) data of the respective pixels from the signals of the peripheral pixels in a mosaic process. The mosaic process connotes calculating 3-color information by conducting the interpolation process from the information of the peripheral pixels, e.g., if each pixel has only one-color information because of the image capturing element being configured by the pixels arrayed based on a Bayer array.

In step S23, the generated output image is output to the display unit 120 at the frame rate of, e.g., 30 fps or 60 fps, thus finishing the process.

It is to be noted that the present control flow is an example of setting the virtual projection plane VP in the fixed shape and using one type of two-dimensional LUT corresponding thereto, however, there may be employed, without being limited to this virtual projection plane, the virtual projection planes VP taking a plurality of different shapes corresponding to types of applications by way of modified examples. In this case, the two-dimensional LUT to be used is selected from the plurality of two-dimensional LUTs corresponding to the plurality of virtual projection planes respectively in step S11, and the control in step S13 is conducted by use of the selected two-dimensional LUT.

Figure 9:
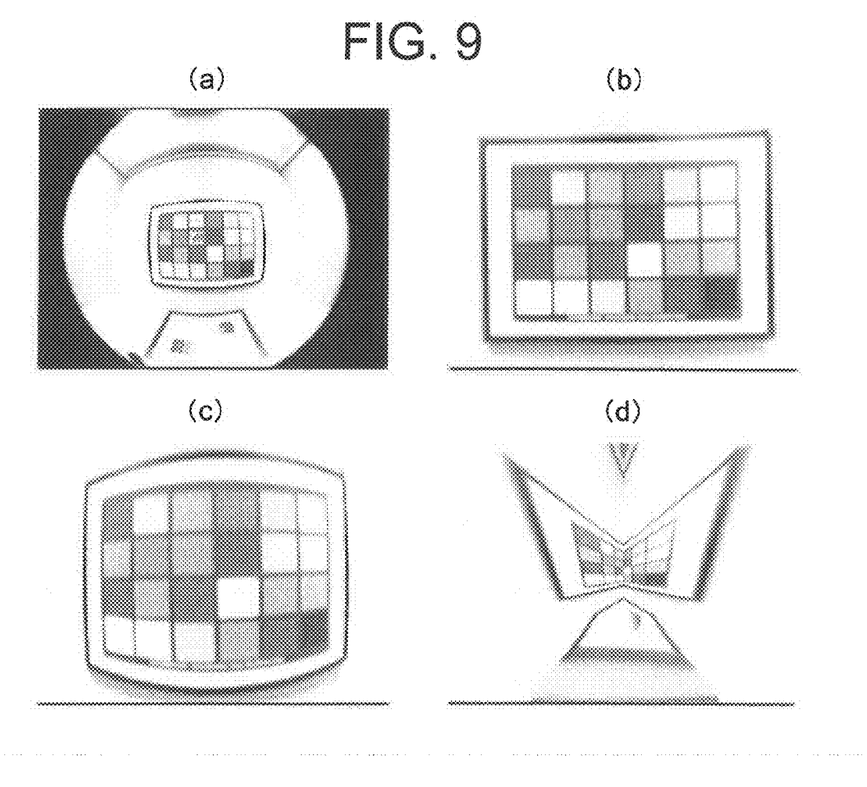
FIG. 9 A view illustrating examples of an input image and output images after a distortion correction process.

FIG. 9 depicts examples of the input image and the output image after the distortion correction process. Note that FIG. 9 illustrates an example of a case in which the position of the virtual projection plane VP is set to the position in the initial status. FIG. 9(a) shows the input image. FIG. 9(b) shows an example of the output image obtained in the setting of the virtual projection plane VP (equal to the datum plane DP in FIG. 1) taking the flat shape. FIG. 9(c) shows an example of the output image obtained in the setting of the virtual projection plane VP taking the cylindrical shape. FIG. 9(d) shows an example of the output image obtained in the setting of the virtual projection plane VP taking the free shape as illustrated in FIGS. 1 and 2. It is feasible to recognize the region having a broad display range in the vicinity of the lower portion (on the near side) in the free shape as illustrated in FIGS. 1 and 2 but being outside the display range on the virtual projection plane VP taking the flat shape and the cylindrical shape.

Another Embodiment

Figure 10:
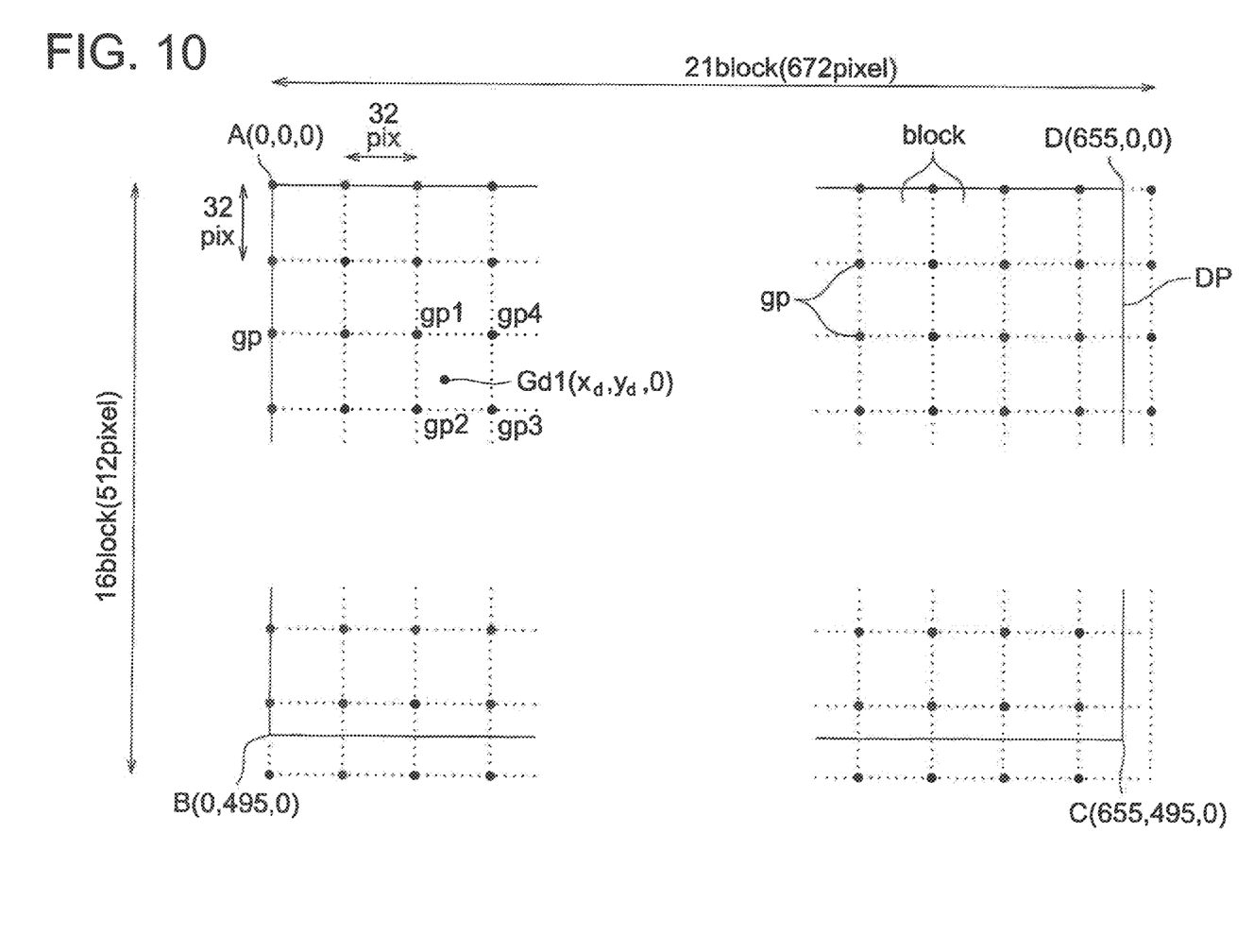
FIG. 10 An explanatory view illustrating a corresponding relationship between the datum plane DP and lattice point data of a two-dimensional LUT in another embodiment.

Next, an example of calculating the data between lattice points, i.e., the lattice point data configuring the two-dimensional LUT on the basis of the liner interpolation, will be described, by way of another embodiment. FIG. 10 is an explanatory diagram of a corresponding relationship between the datum, plane DP and the lattice points of the two-dimensional LUT in another embodiment. In this another embodiment, the two-dimensional LUT is stored with the data of the $z_d$ coordinates of the respective lattice points gp on the virtual projection plane VP. The lattice points gp are disposed at intervals and at predetermined pitches with respect to the pixels Gd and are, in the example illustrated in FIG. 10, arranged at 32-pixel pitches in the $x_d$- and $y_d$-directions on the basis of a certain lattice point gp existing at the point A (0, 0, 0) on the datum plane DP.

A region surrounded by the lattice points gp at the four corners is called a block, in which 21 blocks are disposed in the $x_d$-direction and 16 blocks are disposed in the $y_d$-direction in the example depicted in FIG. 10. Note that an area over which the blocks extend is set to have a size equal to or larger than the size of the datum plane DP. The example illustrated in FIG. 10 is that the size of the datum plane DP is not an integral multiple of the 32-pixel pitch of the lattice points gp, and hence the area (672×512 pixels) over which to extend the blocks is set larger than the size (656×496 pixels) of the datum, plane DP.

When the pixel Gd is overlapped with the lattice point gp, the $z_d$-coordinate of the pixel Gv on the virtual projection plane VP is obtained by referring to the two-dimensional LUT of the lattice points gp. Whereas when the pixel Gd is not overlapped with the lattice point gp, the $z_d$-coordinates of the lattice points go at the four corners of the block are obtained by referring to the two-dimensional LUT, and the thus obtained $z_d$-coordinates of the lattice points gp undergo the linear interpolation, thereby acquiring the $z_d$-coordinates of the pixel Gd. For instance, since the pixel Gd1 is not overlapped with the lattice point gp, the $z_d$-coordinates corresponding to the lattice points gp1, gp2, gp3, gp4 at the four corners on the virtual projection plane VP are obtained in a way that refers to the two-dimensional LUT, whereby the $z_d$-coordinates of the pixel Gv corresponding to the pixel Gd1 on the virtual projection plane VP can be acquired by linearly interpolating the values of the $z_d$-coordinates.

Thus, the contrivance is not that the two-dimensional LUTs are provided for all the pixels on the datum plane DP but that the two-dimensional LUT is configured by the pieces of thinned-out data spaced away as the lattice points are arranged, thereby enabling the data size of the two-dimensional LUT to be reduced.

Examples of Other Shapes of Virtual Projection Planes VP

Figure 11:
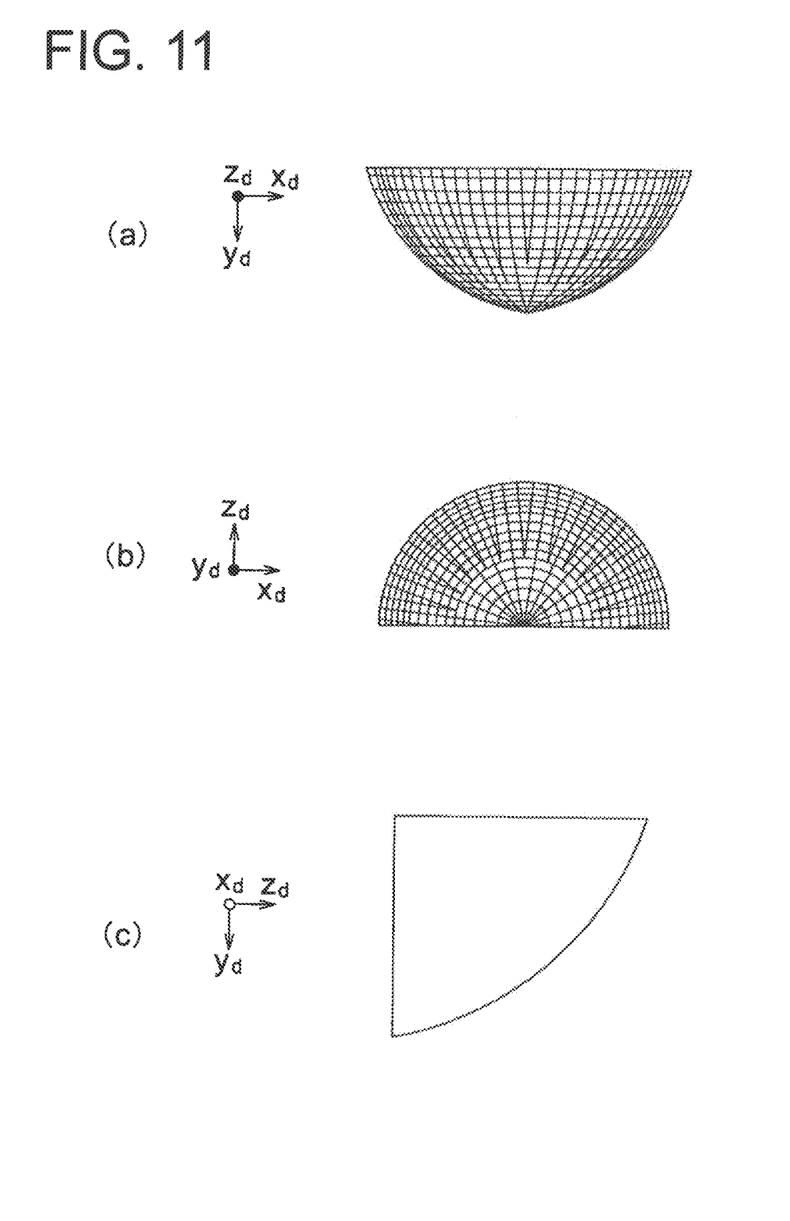
FIG. 11 A view depicting the shape of the virtual projection plane VP.
Figure 12:
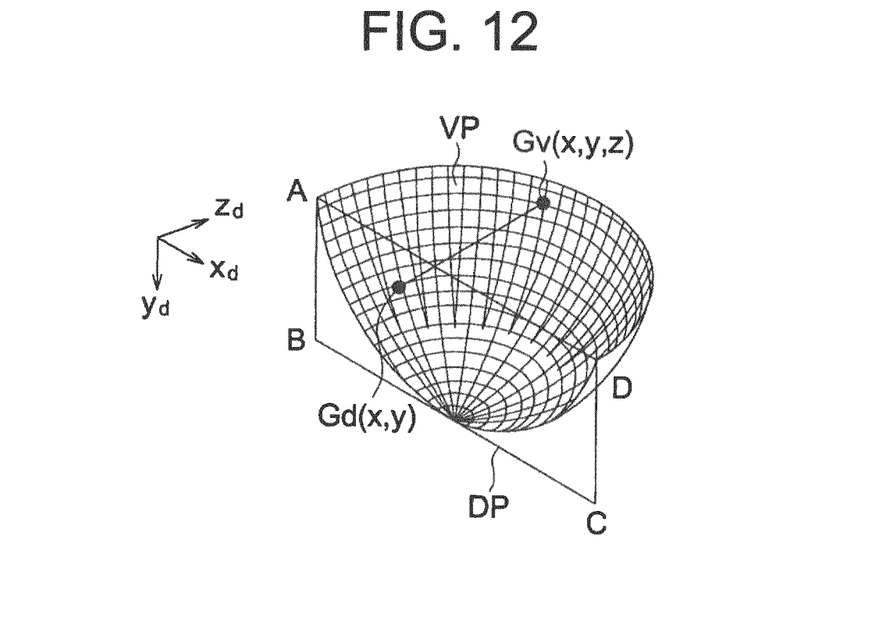
FIG. 12 A schematic view illustrating a relationship between the virtual projection plane VP and the datum plane DP.

FIGS. 11 and 12 show an example of the virtual projection plane VP taking a bowl-like shape. FIG. 11(a) is a front view; FIG. 11(b) is a top view; and FIG. 11(c) is a side view. FIG. 12 is a schematic view illustrating a relationship between the virtual projection plane VP and the datum plane DP. The virtual projection plane VP depicted in FIGS. 11 and 12 takes a shape configured by a free curved surface. The free curved surface connotes a curved surface other than the curved surfaces (the cylinder, the sphere) expressed by the elementary functions. The example illustrated in FIGS. 11 and 12 shows the shape formed by vertically cutting the bowl in halves. Even in the case of the complicated shape formed by the free curved surface such as this, the coordinates on the virtual projection plane VP can be specified by the two-dimensional LUT.

Figure 13:
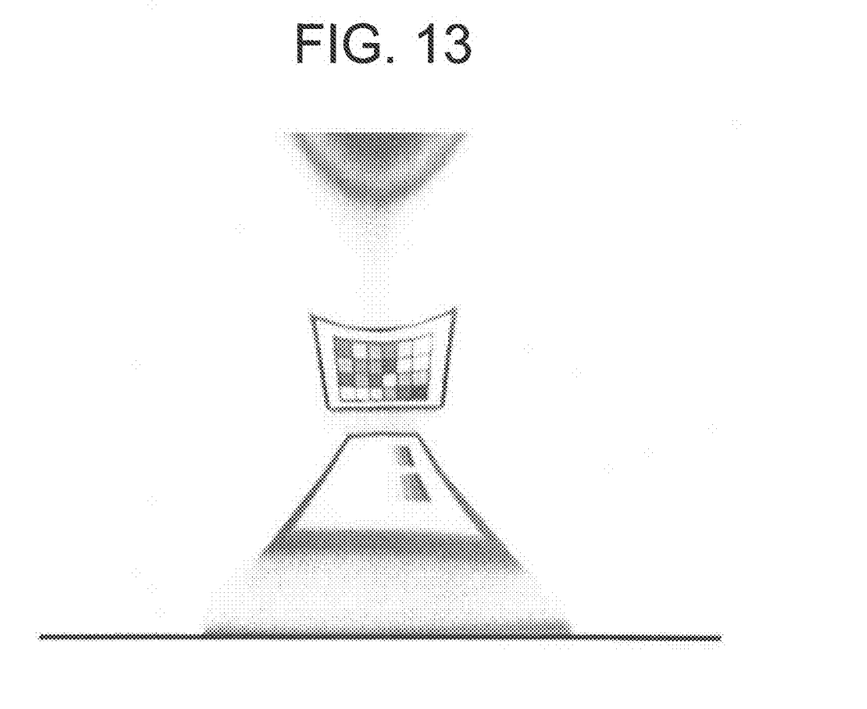
FIG. 13 A view illustrating an example of the output image after the correction process.

FIG. 13 shows an example of the output image obtained in the setting of the virtual projection plane VP taking the howl-like shape illustrated in FIGS. 11 and 12. With the use of the virtual projection plane VP taking the bowl-like shape depicted by way of one example of the free shape, it is feasible to recognize the region having the broad display range in the vicinity of the lower portion (on the near side) but being outside the display range on the virtual projection plane VP taking the fiat shape and the cylindrical shape.

It is apparent to those skilled in the art of the present field, from the embodiments described in the present specification and the technical ideas that the present invention is not limited to the embodiments described in the specification but embraces other embodiments and modified examples. The description of the specification and the embodiments aim at only the exemplifications, and the scope of the present invention is demonstrated by the claims that will hereinafter be described.

DESCRIPTION OF THE REFERENCE NUMERALS AND SYMBOLS

100 control device
101 image processing unit
102 setting unit
103 storage unit
110 image capturing unit
120 display unit
130 operation unit
VP virtual projection plane
DP datum plane
Gd pixel on datum plane
Gv pixel on virtual projection plane
LC central surface of lens
IA image capturing element surface
O center of lens
O center of image
Gd pixel on datum plane
Gv pixel on virtual projection plane

What is claimed is:

1. An image processing method of obtaining image data undergoing a distortion correction process by using plural pieces of pixel data acquired when an image capturing element including a plurality of pixels receives the light via an optical system including a lens, the method comprising:
    a first step of setting a position and a size of a datum plane always having a fixed positional relationship with, a virtual, projection plane in a world coordinate system on the basis of a user's instruction;
    a second step of calculating coordinates of the respective pixels on the virtual projection plane in the world coordinate system on the basis of the datum plane set in the first step, and converting the calculated coordinates into a camera coordinate system by using a distortion correction coefficient of the optical system;
    a third step of calculating the image data on the virtual projection plane on the basis of the plural pieces of pixel data and the coordinates in the camera coordinate system with the conversion being done in the second step,
    wherein datum plane system coordinates $x_d\, y_d\, z_d$ with die datum plane serving as a basis are set, and there is provided a two-dimensional LUT stored with $z_d$ coordinates in a direction perpendicular to the datum plane with respect to $x_d$ and $y_d$-coordinates on the datum plane and based on a shape of the virtual projection plane, and
    the second step includes calculating the coordinates of the respective pixels on the virtual projection plane in the world coordinate system on the basis of the two-dimensional LUT by an image processing unit.

2. The image processing method according to claim 1, wherein the two-dimensional LUT is data corresponding to lattice points arranged at predetermined pitches on the datum plane, and
    the data between the lattice points are calculated based on a linear interpolation.

3. The image processing method according to claim 1, wherein the virtual projection plane is configured by a free curved surface.

4. The image processing method according to claim 1, wherein the two-dimensional LUT can be selected from a plurality of two-dimensional LUTs corresponding to the virtual projection planes taking a plurality of different shapes, and the selected two-dimensional LUT is used in the second step.

5. An image processing apparatus for obtaining image data undergoing a distortion correction process by using plural pieces of pixel data acquired when an image capturing element including a plurality of pixels receives the light via an optical system, the apparatus comprising:

an image processing unit calculating coordinates of the respective pixels on the virtual projection plane in the world coordinate system on the basis of the datum plane, of which a position and a size are set, always having a fixed positional relationship with a virtual projection plane, converting the calculated coordinates into a camera coordinate system by using a distortion correction coefficient, and calculating the image data on the virtual projection plane on the basis of the coordinates in the camera coordinate system with the conversion being done and the plural pieces of pixel data; and a storage unit retaining a two-dimensional LUT stored, datum plane system coordinates $x_d y_d z_d$ with the datum plane as a basis being set, with $z_d$ coordinates in a direction perpendicular to the datum plane with respect to $x_d$- and $y_d$-coordinates on the datum plane and based on a shape of the virtual projection plane, wherein the image processing unit calculates the coordinates of the respective pixels on the virtual projection plane in the world coordinate system on the basis of the two-dimensional LUT.

6. The image processing apparatus according to claim 5, wherein the two-dimensional LUT is data corresponding to lattice points arranged at predetermined pitches on the datum plane, and the data between the lattice points are calculated based on a linear interpolation.

7. The image processing apparatus according to claim 5, wherein the virtual projection plane is configured by a free curved surface.

8. The image processing apparatus according to claim 5, wherein the storage unit retains a plurality of two-dimensional LUTs corresponding to the virtual projection planes taking a plurality of different shapes, and the image processing unit calculates the coordinates of the respective pixels on the virtual projection plane in the world coordinate system on the basis of the two-dimensional LUT selected from the plurality of two-dimensional LUTs.

9. An image capturing apparatus comprising:

an optical system;

an image capturing element including a plurality of pixels;

a setting unit setting a position and a size of the datum plane always having a fixed positional relationship with the virtual projection plane in the world coordinate system;

an image processing unit calculating coordinates of the respective pixels on the virtual projection plane in the world coordinate system on the basis of the datum plane set by the setting unit, converting the calculated coordinates into a camera coordinate system by using a distortion correction coefficient of the optical system, and calculating the image data on the virtual projection plane on the basis of the coordinates in the camera coordinate system with the conversion being done and the pixel data obtained from the plurality of pixels; and a storage unit retaining a two-dimensional LUT stored, datum plane system coordinates $x_d y_d z_d$ with the datum plane as a basis being set, with $z_d$ coordinates in a direction perpendicular to the datum plane with respect to $x_d$- and $y_d$-coordinates on the datum plane and based on a shape of the virtual projection plane, wherein the image processing unit calculates the coordinates of the respective pixels on the virtual projection plane in the world coordinate system on the basis of the two-dimensional LUT.

10. The image capturing apparatus according to claim 9, wherein the two-dimensional LUT is data corresponding to lattice points arranged at predetermined pitches on the datum plane, and the data between the lattice points are calculated based on a linear interpolation.

11. The image capturing apparatus according to claim 9, wherein the virtual projection plane is configured by a free curved surface.

12. The image capturing apparatus according to claim 9, wherein the storage unit retains a plurality of two-dimensional LUTs corresponding to the virtual projection planes taking a plurality of different shapes, and the image processing unit calculates the coordinates of the respective pixels on the virtual projection plane in the world coordinate system on the basis of the two-dimensional LUT selected by the setting unit from the plurality of two-dimensional LUTs.

* * * * *